Patented Dec. 24, 1935

2,025,117

UNITED STATES PATENT OFFICE 2,025,117

AZO DYES AND METHODS FOR THEIR PREPARATION

Herbert A. Lubs, Emmet F. Hitch, and Miles A. Dahlen, Wilmington, Del., assignors to E. I. du Pont de Nemours & Company, Wilmington, Del., a corporation of Delaware No Drawing. Application August 24, 1933,
Serial No. 686,568

15 Claims. (Cl. 260—95)

This invention relates to the preparation of new azo dyes and more particularly refers to water-insoluble dyes and pigments having in the preferred embodiment the following general formula:

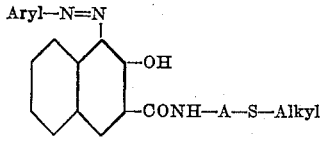

in which aryl represents an aryl nucleus and A represents an arylene nucleus.

It is an object of the present invention to produce new azo dyes and pigments. A further object is to produce azo dyes which will impart bright attractive colors to textile materials. A still further object is to produce insoluble pigments which may be used for a variety of purposes. Additional objects will become apparent from a consideration of the following description.

These objects are attained according to the herein described invention which in its preferred embodiment comprises coupling a diazotized arylamine with an alkyl mercapto-arylamide of 2,3-hydroxy-naphthoic acid.

The invention may be more completely understood by a consideration of the following illustrative examples, in which the quantities are stated in parts by weight.

Example 1

Cotton skeins that had previously been well boiled, bleached and dried were impregnated in a solution of the 2,3-hydroxy-naphthoyl derivative of 4-methylmercapto-aniline, made up as follows:

8 parts of the 2,3-hydroxy-naphthoyl derivative of p-methylmercapto-aniline were pasted up with 15 parts of alcohol, and then 15 parts of caustic soda of 34° Bé. were added. The mixture was agitated until solution was complete, and water was added until a volume of 1000 parts was obtained.

The skeins were wrung out; and, without rinsing or drying, developed in a solution of the diazo salt from m-chloraniline, which was prepared in the following manner:

12.75 parts of m-chloraniline were dissolved in a solution of 26 parts of hydrochloric acid of 22° Bé. in 100 parts of hot water. Ice was added to cool the solution to about 10° C. and 6.9 parts of sodium nitrite, dissolved in 25 parts of water were gradually added. When the diazotization was complete, the solution was given a clarifying filtration, if necessary. Before coupling, the mineral acidity was neutralized with sodium acetate. When the dyeing operation was finished the skeins were rinsed, soaped at the boil, again rinsed and dried.

In this manner a bright reddish-orange dyeing having excellent washing and light fastness was obtained. The dye has the probable formula:

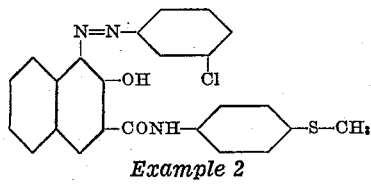

Example 2

Cotton skeins, previously well boiled and dried, were impregnated in a solution of the 2,3-hydroxy-naphthoyl derivative of 4-methylmercapto-aniline, which was prepared as described in Example 1.

The skeins were wrung out and developed in a solution of the diazo salt from 4-nitro-2-amino-anisole which was prepared in the following manner:

16.8 parts of 4-nitro-2-amino-anisole were dissolved in a solution of 26 parts of hydrochloric acid of 22° Bé. in 200 parts of hot water. The solution was cooled to 10° C., and 6.9 parts of sodium nitrite dissolved in 26 parts of water were gradually added. When the diazotization was finished, the solution was given a charcoal clarifying filtration if necessary; and just before coupling, the mineral acidity was neutralized with sodium acetate.

When the dyeing operation was finished, the skeins were rinsed, soaped at the boil, again rinsed and dried. In this manner a red dyeing having excellent washing and light fastness was obtained. It has the probable formula:

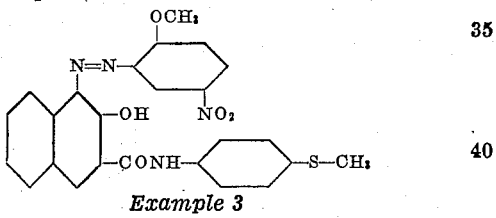

Example 3

Cotton skeins, well boiled and dried, were impregnated with a solution of the 2,3-hydroxy-naphthoyl derivative of 2-methylmercapto-aniline (ortho-thioanisidine). The skeins were wrung out and developed, without rinsing or drying, in a solution of the diazo salt from m-nitro-p-toluidine which was prepared in the following manner:

15.2 parts of 3-nitro-4-amino-toluene were dissolved in a solution of 26 parts of hydrochloric acid of 22° Bé. in 200 parts of hot water. The solution was cooled to 10° C. with ice, and 6.9 parts of sodium nitrite dissolved in 25 parts of water were gradually added. When the diazotization was complete, the solution was given a charcoal clarification; and just before coupling, sodium acetate was added to neutralize the mineral acidity.

The dyed skeins were rinsed, soaped at the boil, again rinsed, and dried. In this manner a red dyeing, having good fastness properties was obtained. The dye has the probable formula:

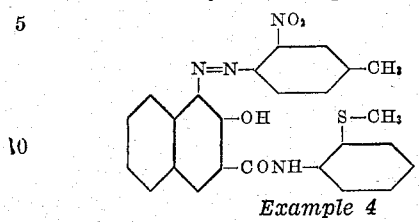

Example 4

Cotton skeins, well boiled, and dried, were impregnated with a solution of the 2,3-hydroxy-naphthoyl derivative of 2-methylmercapto-4-ethoxy-aniline which was prepared as follows:

8 parts of the 2,3-hydroxy-naphthoyl derivative of 2-methylmercapto-4-ethoxy-aniline, were pasted with 15 parts of alcohol, and 15 parts of caustic soda of 34° Bé. were added. When complete solution had been effected, water was added until a volume of 1000 parts was obtained.

The impregnated skeins were wrung out; and without drying, developed in a solution of the diazo salt from 1-amino-4-benzoylamino-2,5-diethoxy-benzene, which was prepared in the following manner:

30.0 parts of 1-amino-4-benzoylamino-2,5-diethoxy-benzene were dissolved in a solution containing 26 parts of hydrochloric acid of 22° Bé. in 300 parts of hot water. The solution was cooled to 10° C. by means of external cooling, and 6.9 parts of sodium nitrite dissolved in 25 parts of water were slowly added, with continuous agitation. When the diazotization was complete, the solution was given a clarifying filtration; and just before coupling, the mineral acidity was neutralized with sodium acetate.

The dyed skeins were rinsed, soaped at the boil, again rinsed, and dried. In this way, a reddish-blue dyeing having good fastness properties was obtained. It has the following probable formula:

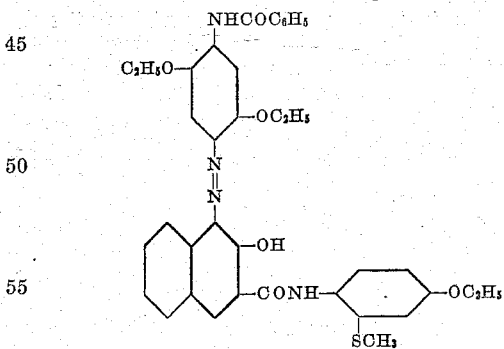

Example 5

9 parts of the 2,3-hydroxy-naphthoyl derivative of p-methylmercapto-aniline were pasted up with 8 parts of Turkey red oil, and 13 parts of caustic soda (34° Bé.) were added. When the material was completely in solution, 1000 parts of hot water were added with agitation.

To the solution prepared as described above, was added an equivalent amount of an aqueous solution of the diazo salt from m-nitro-p-toluidine which was made up in the following manner:

15.2 parts of m-nitro-p-toluidine were mixed with 37.5 parts of water and 30 parts of hydrochloric acid (37%) and agitated for half an hour at room temperature. The solution-suspension was then cooled to 10° C. by means of external cooling, and the diazotization carried out with a solution of 7 parts of sodium nitrite dissolved in 20 parts of water. The solution of sodium nitrite was added rapidly. When the diazotization was finished, the solution was filtered.

The pigment which was formed by mixing the solution of diazotized m-nitro-p-toluidine with the 2,3-hydroxy-naphthoyl derivative of p-methylmercapto-aniline, was washed with alcoholic-caustic, and was then dried and recrystallized from hot nitro benzene. It has the probable formula:

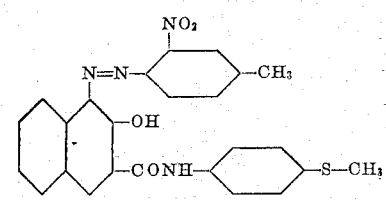

It was a red crystalline solid, melting at 265.5–266.5° C., and dissolved in concentrated sulfuric acid to a bluish-red solution.

Example 6

42.6 parts of 4-chlor-2-amino-toluene were dissolved in a mixture of 30 parts of hydrochloric acid (37%) and 200 parts of water, with warming. 46 parts of hydrochloric acid of the same strength were then added and the solution cooled to 0–5° C., by means of external cooling. The diazotization was carried out by the addition of a solution of 21 parts of sodium nitrite dissolved in 50 parts of water, at 0–5° C. The solution of the diazo salt was then given a charcoal clarification and filtration, and was added to a solution of 43 parts of piperidine-alpha-carboxylic acid and 450 parts of water. The alkalinity was maintained by the addition of soda ash. When the coupling was complete, as shown by the absence of color formation (in the cold) when spotted on filter paper against R-salt, the charge was heated to 40° C., filtered, and the diazo-amino compound salted out of the solution. It was obtained as an oil which was dried in a vacuum at 65° C. When ground, it was a gray colored powder.

A printing paste was made up from—
6.2 parts of a dry mixture of
    3.0 parts of the p-thiomethoxy-anilide of 2,3-hydroxy-naphthoic acid
    3.2 parts of the diazo-amino compound obtained above
3.0 parts of caustic soda solution (40° Bé.)
65.0 parts of starch tragacanth thickener
25.8 parts of water 100.0

Cotton piece goods were printed from an engraved copper roll with the printing paste. The print was then developed in a steam-acetic-acid-ager, and was rinsed, soaped, again rinsed, and dried.

In this manner a bright scarlet printing, having good fastness properties was obtained. The dye has the probable formula:

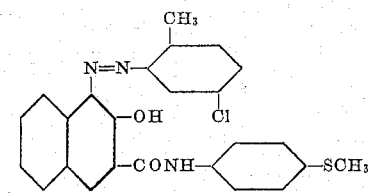

In addition to those arylamines diazotized and coupled according to the instructions given in the aforementioned examples numerous other arylamines may be utilized with good results. These compounds may be selected from amines of various aromatic series, for example amines of the benzene, diphenyl, azobenzene, naphthalene, anthraquinone and carbazole series. In general, it may be stated, however, that amines of the benzene or napthalene series are preferred for this purpose.

Furthermore, the amine selected may have one or more groups substituted thereon. Since the processes described herein are particularly directed to the production of ice colors it is advisable that the arylamine selected be free from water-solubilizing substituents, such as carboxylic and sulfonic acid groups. With the exception of water-solubilizing groups, however, it is to be understood that one or more of the non-water-solubilizing groups may be substituted thereon. Examples of a few groups falling within this category are alkyl, alkoxy, aryloxy, nitro, halogen, trifluoromethyl and acylamino groups. A few of the members selected from the large class of well known ice color bases, suitable for use herein, are:

p-Chloro-aniline
    2,5-dichloro-aniline
    4-chloro-2-amino-toluene
    4-chloro-2-amino-anisole
    4-chloro-2-amino-diphenylether
    3-amino-carbazole
    1-amino-2-methoxy-naphthalene
    m-Trifluoromethyl-aniline
    5-nitro-2-amino-toluene
    4-nitro-2-amino-anisole
    a-Amino-anthraquinone
    2,4-dimethyl-5-benzoylamino-aniline
    o-Ethoxy-benzene-azo-a-naphthylamine
    4,4'-diamino-diphenyl-ether
    4,4'-diamino-diphenylamine
    Dianisidine
    2,4-dinitraniline The coupling component is likewise capable of considerable variation. The alkyl mercapto-arylamides which are suitable for use in this connection are described in much more detail, and are claimed, in a copending application, Serial No. 686,238, filed August 22, 1933. These arylamides are preferably produced from arylamides of the benzene or naphthalene series. As in the case of the diazo component, the arylamide should be free from water-solubilizing groups when the product desired is an ice color. One or more non-water-solubilizing groups may, however, be substituted thereon. Among the groups falling within this class mention may be made of the alkyl, alkoxy, halogen, nitro and additional alkyl-mercapto groups. A few representative compounds selected from this category are the 2,3-hydroxy-naphthoyl derivatives of the following arylamines:

4-ethylmercapto-aniline
    2-methylmercapto-5-methoxy-aniline
    4-chloro-2-methylmercapto-aniline
    4-methylmercapto-alpha-naphthylamine
    5-chloro-2-methylmercapto-aniline
    4-chloro-3-ethylmercapto-aniline
    2,4-diethylmercapto-aniline
    5-nitro-2-methylmercapto-aniline
    4-butylmercapto-aniline
    2-hexylmercapto-aniline While arylamides of 2,3-hydroxy-naphthoic acid are preferred, it is to be understood that this invention also includes within its scope derivatives of other hydroxy-aryl-carboxylic acids, for example:

1-naphthol-4-carboxylic acid
    2-naphthol-6-carboxylic acid
    6- or 7-amino-, alkylamino-, arylamino-, or acylamino-2-naphthol-3-carboxylic acids
    Ring alkylated (and alkoxylated)-2-naphthol-3-carboxylic acids
    Hydroxy-anthracene-carboxylic acids
    Hydroxy-carbazole-carboxylic acids
    Hydroxy-naphthocarbazole-carboxylic acids
    Hydroxy-phenanthrene-carboxylic acids
    Hydroxy-indole-carboxylic acids
    Salicylic acid and its alkyl-, alkoxy- and halogeno derivatives
    Hydroxy-diarylamine-carboxylic acids, etc.

The compounds comprised herein may be used as insoluble pigments or they may be utilized to impart color to textile materials, preferably cotton or regenerated cellulose. When used for the latter purpose they may be applied according to well known methods. A few of these methods will now be briefly referred to for purposes of illustration:

(1) Textile fibers may be padded with the arylamides comprised herein and developed by immersing in solutions of the diazo salts previously described, preferably in the presence of acid binding agents.

(2) The fibers may be padded with the aforementioned arylamides and printed with pastes containing the diazo salts previously referred to.

(3) The diazo salts may be converted to the corresponding nitrosamines, the latter being incorporated in alkaline printing pastes which also contain the new arylamides, alkalies, etc. Textile fibers may be printed with this paste and developed by treatment with weak acids.

(4) The diazo salts may be converted to water-soluble diazoimino derivatives, which are incorporated in printing pastes with the arylamides described, alkalies, etc. Textile fibers may be printed therewith and developed by treatment with weak acids at elevated temperatures.

In order to amplify the aforementioned description a few of the many compounds comprised herein, with the resulting shades produced thereby, will now be given:

| Coupling component | Diazo component | Shade |
| --- | --- | --- |
| 2,3-hydroxy-naphthoyl derivative of: | | |
| 4-methylmercapto-aniline. | 1-amino-4-benzoyl-amino-2,5-dimethoxy-benzene. | Blue. |
| Do | 2,5-dichloraniline | Scarlet. |
| Do | 5-nitro-2-amino-anisole | Bluish-red. |
| Do | p-chlor-o-nitroaniline | Red. |
| 2-methylmercapto-aniline. | m-chloraniline | Orange. |
| Do | 1-amino-4-benzoylamino-2,5-diethoxy-benzene. | Blue. |
| Do | 4-chlor-2-thiomethoxy-6-methylaniline. | Violet. |
| Do | N-(p-amino-benzoyl) aniline. | Orange. |
| Do | 4-nitro-2-amino-anisole | Scarlet. |
| 2-methylmercapto-4-ethoxyaniline. | 4-nitro-2-amino-anisole | Red. |
| Do | m-chloraniline | Orange. |
| Do | m-nitro-p-toluidine | Red. |
| Do | N-(p-amino-benzoyl) aniline. | Orange. |
| Do | 4-chlor-2-methylmercapto-6-methyl-aniline. | Violet. |

The dyes comprised herein are particularly adapted for imparting fast shades having attractive properties to textile materials such as cotton and regenerated cellulose. These compounds are also well suited for use as pigments. While the processes previously described are especially suited for the preparation of ice colors, they are by no means limited thereto, since other more soluble compounds may also be produced.

As many apparently widely different embodiments of this invention may be made without departing from the spirit and scope thereof, it is to be understood that the invention is not limited to the specific embodiments thereof except as defined in the appended claims.

We claim:

1. A process for producing azo dyes which comprises coupling members selected from the group consisting of diazotized arylamines and tetrazotized arylene diamines with an alkylmercapto-arylamide of a hydroxy-aryl-carboxylic acid.

2. A process for producing water-insoluble azo dyes which comprises coupling a diazotized arylamine selected from the group consisting of arylamines of the benzene, diphenyl, azobenzene, naphthalene, anthraquinone and carbazole series, free from carboxylic and sulfonic acid groups, with an arylamide of 2,3-hydroxy-naphthoic acid having the following general formula:

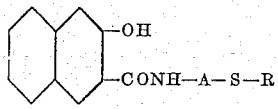

in which A represents an arylene nucleus of the benzene or naphthalene series free from carboxylic and sulfonic acid groups, and R represents an alkyl group.

3. A process for producing water-insoluble azo dyes which comprises coupling a diazotized arylamine of the benzene series, free from carboxylic and sulfonic acid groups, with an arylamide of 2,3-hydroxy-naphthoic acid having the following general formula:

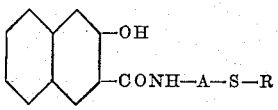

in which A represents an arylene nucleus of the benzene series, free from carboxylic and sulfonic acid groups, and R represents an alkyl group.

4. A process for producing water-insoluble azo dyes which comprises coupling a diazotized arylamine of the benzene series, free from carboxylic and sulfonic acid groups, with an arylamide of 2,3-hydroxy-naphthoic acid having the following general formula:

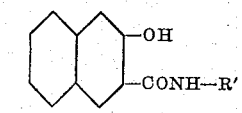

wherein R' represents an alkylmercapto-benzene, an alkylmercapto-alkyl-benzene, an alkylmercapto-alkoxy-benzene, or an alkylmercapto-halogeno-benzene radical.

5. A process for producing water-insoluble azo dyes which comprises coupling a diazotized arylamine of the benzene series, free from carboxylic and sulfonic acid groups, with an arylamide of 2,3-hydroxy-naphthoic acid having the following general formula:

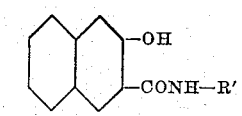

wherein R' represents a methylmercapto-benzene radical.

6. A process for producing water-insoluble azo dyes which comprises coupling a diazotized arylamine of the benzene series, free from carboxylic and sulfonic acid groups, with an arylamide of 2,3-hydroxy-naphthoic acid having the following general formula:

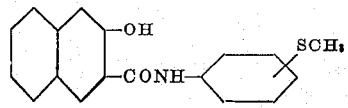

7. A process for producing a water-insoluble azo dye which comprises coupling diazotized meta-chloraniline with the 2,3-hydroxy-naphthoyl derivative of 4-methylmercapto-aniline.

8. Azo dyes having the following general formula:

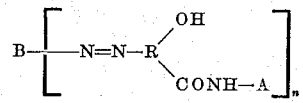

wherein R represents an aryl radical, B represents the radical of a diazotized arylamine or tetrazotized arylene diamine, A represents the radical of an arylamine having substituted thereon at least one alkylmercapto group, and $n$ represents the integer 1 or 2.

9. Azo dyes having the following general formula:

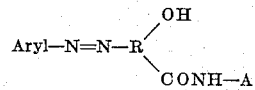

in which R represents an aryl radical, aryl represents the radical of a diazotized arylamine, and A represents the radical of an arylamine having substituted thereon at least one alkylmercapto group.

10. Water-insoluble azo dyes having the following general formula:

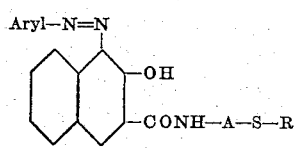

in which aryl represents the radical of a diazotized arylamine of the benzene, diphenyl, azobenzene, naphthalene, anthraquinone or carbazole series, free from carboxylic and sulfonic acid groups, A represents an arylene nucleus of the benzene or naphthalene series free from carboxylic and sulfonic acid groups, and R represents an alkyl group.

11. Water-insoluble azo dyes having the following general formula:

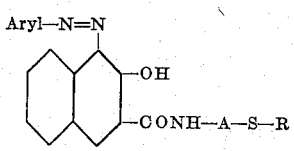

in which aryl represents the radical of a diazotized arylamine of the benzene series, free from carboxylic and sulfonic acid groups, A represents an arylene nucleus of the benzene series, free from carboxylic and sulfonic acid groups, and R represents an alkyl group.

12. Water-insoluble azo dyes having the following general formula:

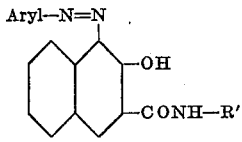

wherein aryl represents the radical of a diazotized arylamine of the benzene series, free from carboxylic and sulfonic acid groups, and R' represents an alkylmercapto-benzene, an alkylmercapto-alkyl-benzene, an alkylmercapto-alkoxybenzene, or an alkyl-mercapto-halogeno-benzene radical.

13. Water-insoluble azo dyes having the following general formula:

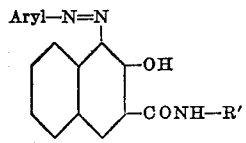

wherein aryl represents the radical of a diazotized arylamine of the benzene series, free from carboxylic and sulfonic acid groups, and R' represents a methylmercapto-benzene radical.

14. Water-insoluble azo dyes having the following general formula:

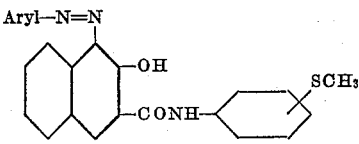

wherein aryl represents the radical of a diazotized arylamine of the benzene series, free from carboxylic and sulfonic acid groups.

15. A water-insoluble azo dye having the following formula:

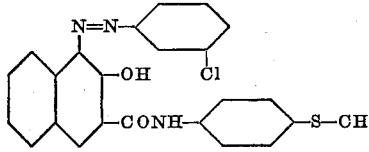

HERBERT A. LUBS.
EMMET F. HITCH.
MILES A. DAHLEN.

CERTIFICATE OF CORRECTION.

Patent No. 2,025,117.                                December 24, 1935.

HERBERT A. LUBS, ET AL.

It is hereby certified that error appears in the printed specification of the above numbered patent requiring correction as follows: Page 3, first column, line 51, for "arylamides" read arylamines; and that the said Letters Patent should be read with this correction therein that the same may conform to the record of the case in the Patent Office.

Signed and sealed this 18th day of February, A. D. 1936.

Leslie Frazer (Seal)                                Acting Commissioner of Patents.